(12) United States Patent
Nakhajavani et al.

(10) Patent No.: US 11,111,937 B2
(45) Date of Patent: Sep. 7, 2021

(54) FAULT PREDICTION IN HYDRAULIC SYSTEMS (71) Applicant: THE BOEING COMPANY, Chicago, IL (US)

(72) Inventors: Omid B. Nakhajavani, Kirkland, WA (US); Greg Jackson, Seattle, WA (US)

(73) Assignee: THE BOEING COMPANY, Chicago, IL (US)

(*) Notice: Subject to any disclaimer, the term of this patent is extended or adjusted under 35 U.S.C. 154(b) by 49 days.

(21) Appl. No.: 16/023,514

(22) Filed: Jun. 29, 2018

(65) Prior Publication Data

US 2020/0003237 A1 Jan. 2, 2020

(51) Int. Cl.
F15B 21/02 (2006.01)
F15B 19/00 (2006.01)
B64C 25/22 (2006.01)

(52) U.S. Cl.
CPC ............ *F15B 19/005* (2013.01); *F15B 21/02* (2013.01); *B64C 25/22* (2013.01)

(58) Field of Classification Search
CPC ......... F15B 19/005; F15B 21/02; B64C 25/22
See application file for complete search history.

(56) References Cited

U.S. PATENT DOCUMENTS

| 6,119,074 | A | 9/2000 | Sarangapani | |
|---|---|---|---|---|
| 7,962,295 | B2 | 6/2011 | Vianna | |
| 10,161,243 | B2* | 12/2018 | Franklin | E21B 47/117 |
| 2006/0075968 | A1* | 4/2006 | Leung | H01J 37/32935 118/723 R |
| 2006/0220917 | A1* | 10/2006 | Nance | B64C 25/00 340/960 |
| 2007/0101785 | A1* | 5/2007 | Peckham | B21J 15/02 72/17.2 |
| 2008/0115575 | A1* | 5/2008 | Meek | E21B 49/10 73/152.24 |
| 2014/0046533 | A1* | 2/2014 | Nance | B64F 5/60 701/33.7 |
| 2014/0069081 | A1* | 3/2014 | Tylutki | F01N 11/002 60/274 |
| 2015/0354346 | A1* | 12/2015 | Franklin | G01M 3/26 702/51 |
| 2015/0354347 | A1* | 12/2015 | Franklin | G01M 3/28 702/51 |
| 2017/0134087 | A1* | 5/2017 | Law | H04B 7/18508 |
| 2018/0043998 | A1* | 2/2018 | Luce | B64C 25/34 |
| 2018/0162338 | A1* | 6/2018 | Irwan | B60T 17/221 |
| 2018/0163373 | A1* | 6/2018 | Murugesan | E02F 9/2228 |

* cited by examiner

*Primary Examiner* — Santosh R Poudel
(74) *Attorney, Agent, or Firm* — Patterson + Sheridan, LLP (57) ABSTRACT Fault prediction improvements are provided herein via pruning a dataset by selecting a subset of the dataset for use as a pruned dataset, wherein the pruned dataset includes pressure data for a hydraulic system correlated in time with command signals for a plurality of deployment events of the hydraulic system, and in response to determining that a given pressure value for a given deployment event in the pruned dataset satisfies a low pressure threshold and that a change in pressure values over time during the given deployment event satisfies a pressure slope threshold, generating a service message for the hydraulic system that indicates that the hydraulic system is in a prefault state.

16 Claims, 7 Drawing Sheets

FAULT PREDICTION IN HYDRAULIC SYSTEMS

FIELD

The present disclosure relates to fault prediction, and more specifically to improvements in computing devices used to determine when hydraulic systems are in a prefault state.

BACKGROUND

Hydraulic systems use a contained fluid to apply forces over distances and/or with mechanical advantage based on the applied pressures and surface areas within a hydraulic actuator. Hydraulic systems are used, for example, in brake systems to transfer a force applied to a brake pedal to brake pads in various vehicles, in hydraulic actuators to control arms of construction equipment, extend landing gear in aircraft, remotely open doors, etc. The fluid contained in the hydraulic system (i.e., the hydraulic fluid) may be one of various fluids with a coefficient of compressibility of zero or nearly zero, such as water or a mineral oil.

Some solutions for fault detection in hydraulic systems include preventative maintenance schedules and alerts based on raw pressure or volume data. However, preventative maintenance schedules merely provide general guidelines for maintaining hydraulic systems that may result in unneeded maintenance being performed.

SUMMARY

The present disclosure provides in one embodiment, a method for fault prediction in hydraulic systems, comprising: pruning a dataset by selecting a subset of the dataset for use as a pruned dataset, wherein the pruned dataset includes pressure data for a hydraulic system correlated in time with command signals for a plurality of deployment events of the hydraulic system; and in response to determining that a given pressure value for a given deployment event in the pruned dataset satisfies a low pressure threshold and that a change in pressure values over time during the given deployment event satisfies a pressure slope threshold, generating a service message for the hydraulic system.

In one aspect, in combination with any example method above or below, pruning the dataset comprises selecting the subset of the dataset based on at least one of: wherein the plurality of deployment events selected last for at least a predetermined amount of time; wherein the plurality of deployment events selected include a deployment condition; and wherein the pressure data during the plurality of deployment events selected satisfy a valid-pressure threshold.

In one aspect, in combination with any example method above or below, pruning the dataset further comprises selecting the plurality of deployment events based on a difference between a maximum pressure value in a particular deployment event and a minimum value in the particular deployment event satisfying a range threshold.

In one aspect, in combination with any example method above or below, the deployment condition includes at least one of: a given altitude at which the deployment events occur; and a given temperature at which the deployment events occurs.

In one aspect, in combination with any example method above or below, the change in pressure values over time during the given deployment event is correlated to a low pressure spike occurring at a start of the given deployment event.

In one aspect, in combination with any example method above or below, determining that the given deployment event satisfies the pressure slope threshold further comprises: determining that a first change in pressure values over time during a first deployment event satisfies a first pressure slope threshold; and determining that a second change in pressure values over time during a second deployment event satisfies a second pressure slope threshold; wherein the second deployment occurs subsequent to the first deployment; and wherein the second pressure slope threshold is greater than the first pressure slope threshold.

In one aspect, in combination with any example method above or below, the hydraulic system operates landing gear of an aircraft.

In another embodiment, the present disclosure provides a non-transitory computer-readable storage device including processor executable instructions that enable a processor to perform operations for fault prediction in hydraulic systems comprising: pruning a dataset by selecting a subset of the dataset for use as a pruned dataset, wherein the pruned dataset includes pressure data for a hydraulic system correlated in time with command signals for a plurality of deployment events of the hydraulic system; and in response to determining that a given pressure value for a given deployment event in the pruned dataset satisfies a low pressure threshold and that a change in pressure values over time during the given deployment event satisfies a pressure slope threshold, generating a service message for the hydraulic system.

In one aspect, in combination with any example non-transitory computer-readable storage device above or below, pruning the dataset comprises selecting the subset of the dataset based on at least one of: wherein the plurality of deployment events selected last for at least a predetermined amount of time; wherein the plurality of deployment events selected include a deployment condition; and wherein the pressure data during the plurality of deployment events selected satisfy a valid-pressure threshold.

In one aspect, in combination with any example non-transitory computer-readable storage device above or below, pruning the dataset further comprises selecting the plurality of deployment events based on a difference between a maximum pressure value in a particular deployment event and a minimum value in the particular deployment event satisfying a range threshold.

In one aspect, in combination with any example non-transitory computer-readable storage device above or below, the deployment condition includes at least one of: a given altitude at which the deployment events occur; and a given temperature at which the deployment events occurs.

In one aspect, in combination with any example non-transitory computer-readable storage device above or below, the change in pressure values over time during the given deployment event is correlated to a low pressure spike occurring at a start of the given deployment event.

In one aspect, in combination with any example non-transitory computer-readable storage device above or below, determining that the given deployment event satisfies the pressure slope threshold further comprises: determining that a first change in pressure values over time during a first deployment event satisfies a first pressure slope threshold; and determining that a second change in pressure values over time during a second deployment event satisfies a second pressure slope threshold; wherein the second deployment occurs subsequent to the first deployment; and wherein the second pressure slope threshold is greater than the first pressure slope threshold.

In one aspect, in combination with any example non-transitory computer-readable storage device above or below, the hydraulic system operates landing gear of an aircraft.

In a further embodiment, the present disclosure provides a system for fault prediction in hydraulic systems, comprising: a processor; and a memory, the memory including instructions that, when executed by the processor, enable the processor to: prune a dataset by selecting a subset of the dataset for use as a pruned dataset, wherein the pruned dataset includes pressure data for a hydraulic system correlated in time with command signals for a plurality of deployment events of the hydraulic system; and in response to determining that a given pressure value for a given deployment event in the pruned dataset satisfies a low pressure threshold and that a change in pressure values over time during the given deployment event satisfies a pressure slope threshold, generate a service message for the hydraulic system.

In one aspect, in combination with any example system above or below, pruning the dataset comprises selecting the subset of the dataset based on at least one of: wherein the plurality of deployment events selected last for at least a predetermined amount of time; wherein the plurality of deployment events selected include a deployment condition; and wherein the pressure data during the plurality of deployment events selected satisfy a valid-pressure threshold.

In one aspect, in combination with any example system above or below, pruning the dataset further comprises selecting the plurality of deployment events based on a difference between a maximum pressure value in a particular deployment event and a minimum value in the particular deployment event satisfying a range threshold.

In one aspect, in combination with any example system above or below, the deployment condition includes at least one of: a given altitude at which the deployment events occur; and a given temperature at which the deployment events occurs.

In one aspect, in combination with any example system above or below, the change in pressure values over time during the given deployment event is correlated to a low pressure spike occurring at a start of the given deployment event.

In one aspect, in combination with any example system above or below, determining that the given deployment event satisfies the pressure slope threshold further comprises: determining that a first change in pressure values over time during a first deployment event satisfies a first pressure slope threshold; and determining that a second change in pressure values over time during a second deployment event satisfies a second pressure slope threshold; wherein the second deployment occurs subsequent to the first deployment; and wherein the second pressure slope threshold is greater than the first pressure slope threshold.

In one aspect, in combination with any example system above or below, the hydraulic system operates landing gear of an aircraft.

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings.

DETAILED DESCRIPTION

The present disclosure relates fault prediction, and more specifically to improvements in efficiency and reliability for computing devices used to determine when hydraulic systems are in a prefault state. As hydraulic systems are often used in subsystems of various complex systems, such as the breaking subsystems of vehicles, landing gear subsystems of aircraft, extension subsystems of lifts, etc., the proper functioning of the hydraulic system may be essential for the non-fault operation of the complex system. By knowing when the hydraulic system is approaching a fault state (i.e., when the hydraulic system has entered a prefault state), maintenance may be scheduled to avoid unscheduled downtime or unexpected faults in the complex system.

Figure 1A:
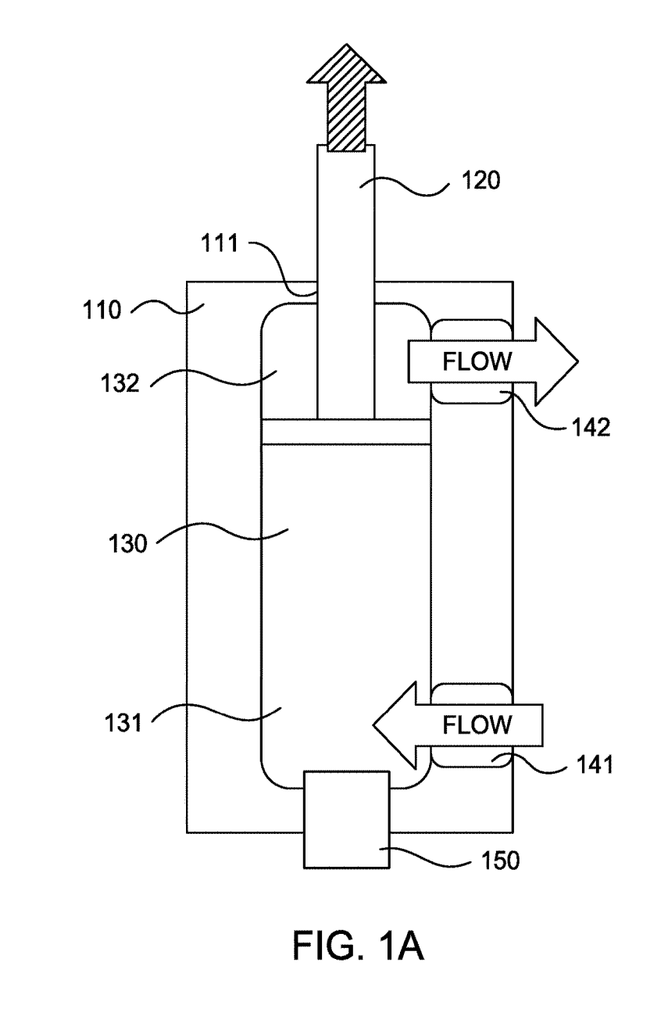
FIGS. 1A and 1B illustrate a hydraulic cylinder in cross-sectional views of a first state and in a second state, according to embodiments described herein.
Figure 1B:
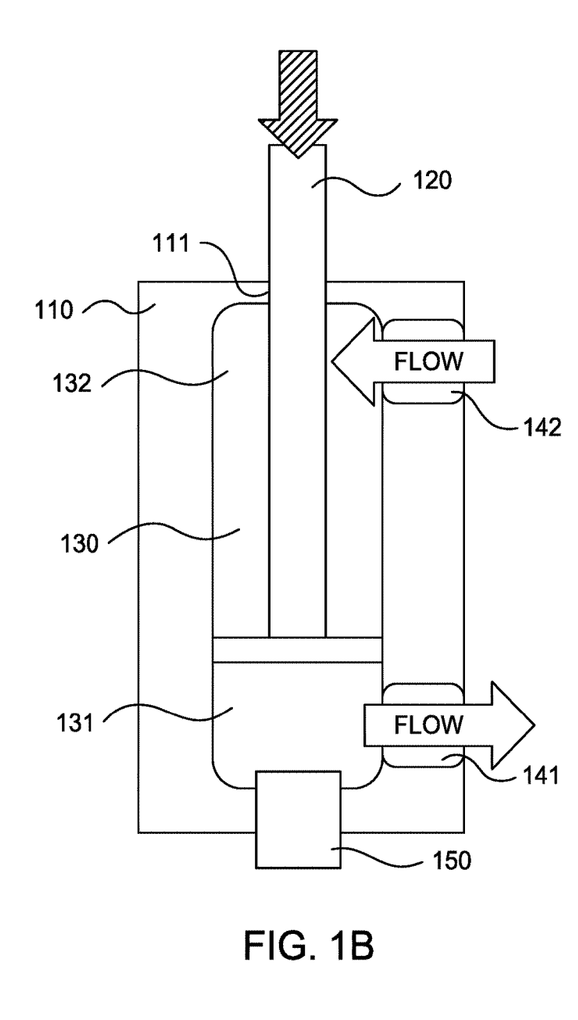

FIGS. 1A and 1B illustrate an example hydraulic cylinder 100 in cross-sectional views of a first state 101 and in a second state 102. The example hydraulic cylinder 100 is presented in a simplified form to introduce and illustrate various concepts discussed in greater detail elsewhere in the present disclosure. The present disclosure may be applied to hydraulic systems with different hydraulic elements than the hydraulic cylinder 100 of FIGS. 1A and 1B, which is provided herein as a non-limiting example.

The example hydraulic cylinder 100 includes a shell 110 and a piston 120. The shell 110 defines chamber 130 in which a hydraulic fluid and the piston 120 are present. The piston 120 divides the chamber 130 into a first portion 131 and a second portion 132, which may change in relative volume of the chamber 130 as the piston 120 moves. The piston 120 extends into the chamber 130 via a rod port 111 in the shell 110, which has a (typically circular) cross-section of sufficient area to accommodate the piston 120, and may include various seals or bushings to retain the hydraulic fluid in the chamber 130 as the piston 120 moves into and out of the chamber 130.

A first fluid port 141 and a second fluid port 142 are also defined in the shell 110 that allow an external force imparted on the hydraulic fluid to transfer to the piston 120 to affect a position of the piston 120 in the chamber 130. For example, FIG. 1A illustrates hydraulic fluid flowing into (and growing) the first portion 131 via the first fluid port 141 and out of the second portion 132 via the second fluid port 142, which causes the piston 120 to extend from the chamber 130. In contrast, FIG. 1B illustrates hydraulic fluid flowing into the second portion 132 via the second fluid port 142 and out of the first portion 131 via the first fluid port 141, which causes the piston 120 to retract into the chamber 130.

A pump (not illustrated) may be connected to the hydraulic cylinder 100 via one or more of the first fluid port 141 and the second fluid port 142 as an external pressure source to affect the flow of the hydraulic fluid and thereby control a distance than the piston 120 extends relative to the shell 110. The piston 120 extends out of or retracts into the chamber 130 based on the force transferred via the hydraulic fluid, which may be represented by the formula: F=P·A, where F is the force exerted on the piston 120, P is pressure exerted on the hydraulic fluid, and A is the area over which the pressure is applied (e.g., the facial area of the piston 120). One or more pressure sensors 150 may be deployed in the chamber 130 at various points to measure the pressure experience within the chamber 130, and may be wired or wirelessly connected to a computing device (not illustrated) to report pressure readings to.

An individual extension or retraction of a piston 120 relative to the shell 110 may be referred to herein as a deployment event. During a deployment event, due to inertia, the properties of the external pressure source, lack of hydraulic fluid, ambient temperature/pressure affecting the volume or compressibility of the hydraulic fluid, a contaminant in the hydraulic fluid (with a higher coefficient on compressibility than the hydraulic fluid), the hydraulic fluid having a coefficient of compressibility greater than zero, etc., the pressure applied to the hydraulic fluid and/or the force applied to the piston 120 may vary. For example, the hydraulic fluid may start at a resting pressure P1 and climb to an active pressure P2 during the course of a deployment event. In another example, the hydraulic fluid begins a deployment event at pressure P1, dips to pressure P2 during the deployment event, and returns to pressure P1 at the end of the deployment event. The pressure sensor 150 measures these pressures over the course of the deployment event so that a prefault state in the hydraulic system may be identified.

Figure 2A:
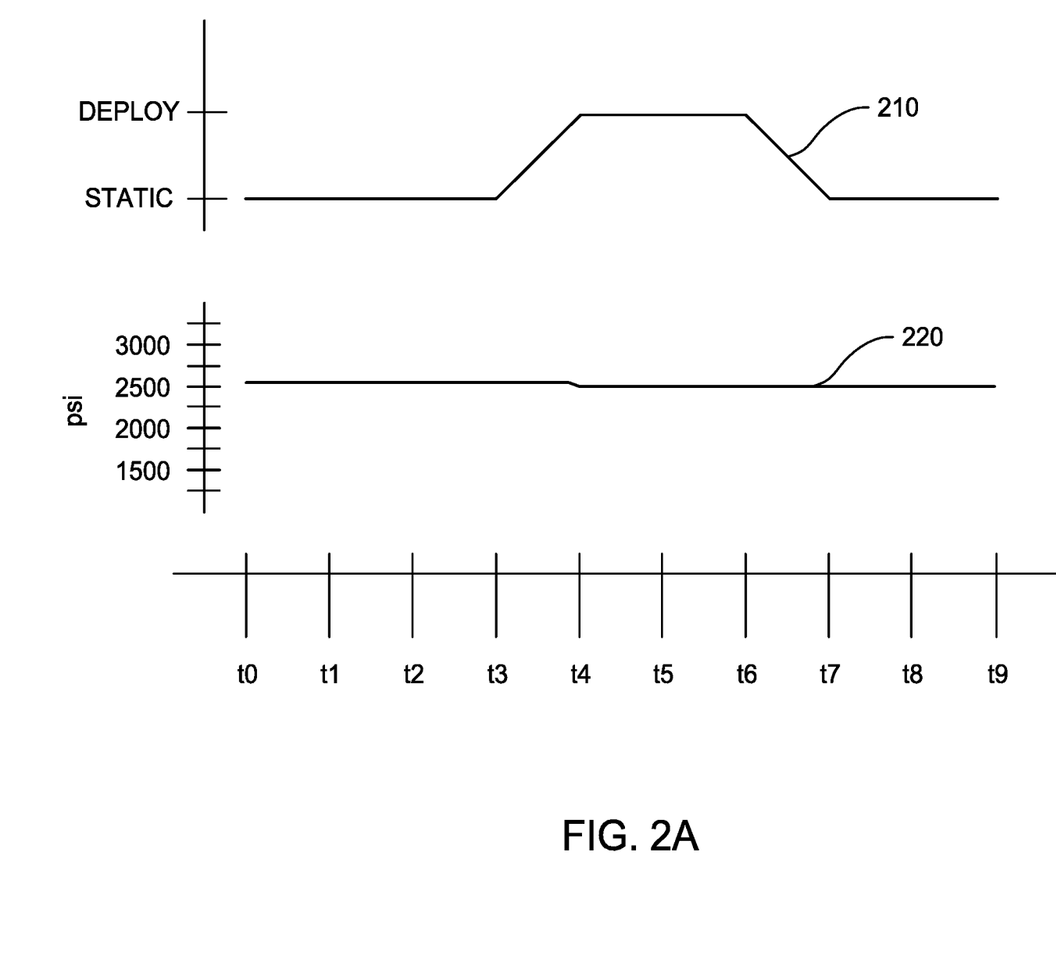
FIGS. 2A-C are time series of a various deployment events, according to embodiments described herein.
Figure 2B:
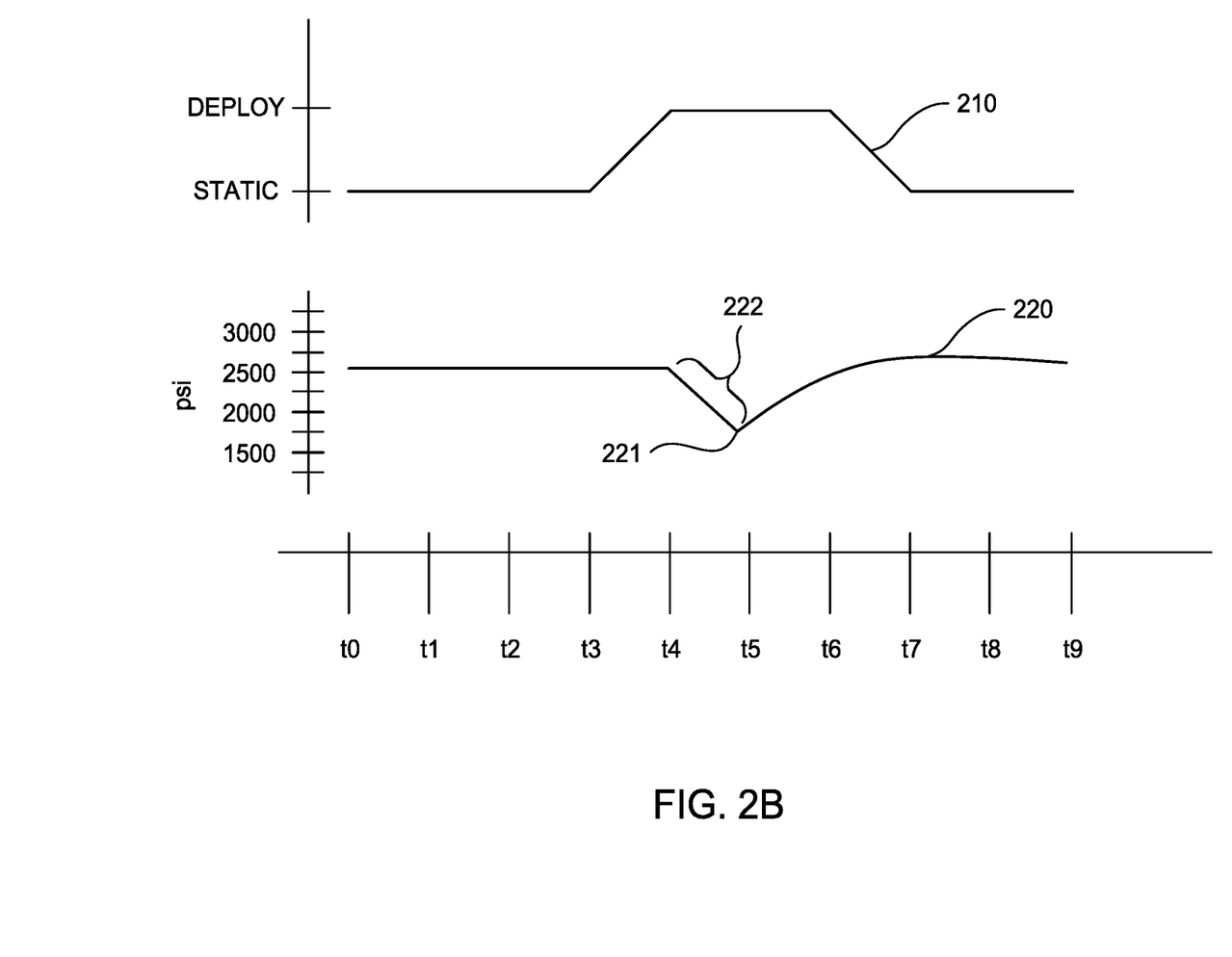
Figure 2C:
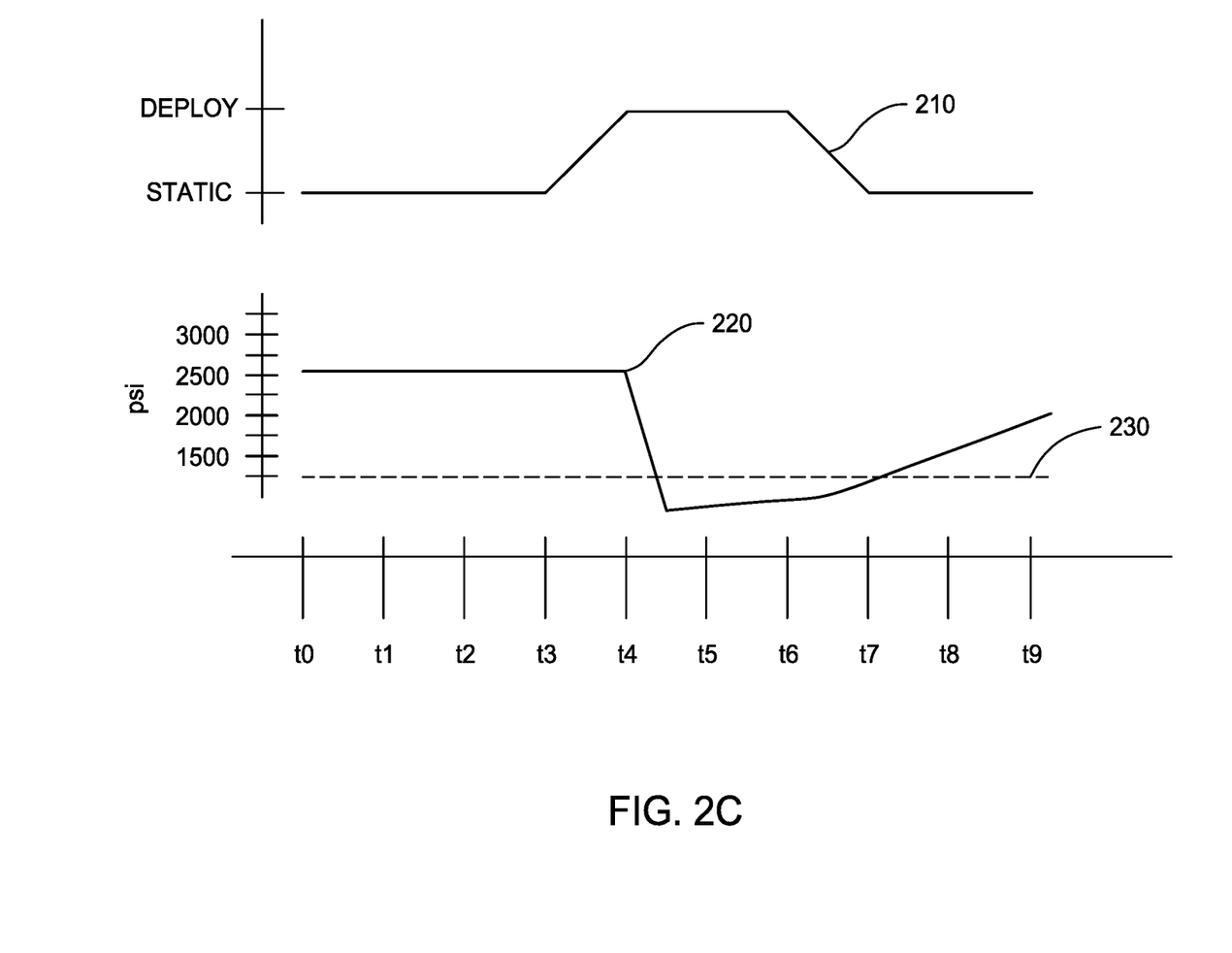

FIGS. 2A-C are time series of a various deployment events. In each deployment event, the control signal 210 for the deployment event is shown in correlation with a pressure reading 220 taken by pressure sensors 150 during the deployment event. FIG. 2A illustrates a time series for a deployment event for a hydraulic system in a nominal state, FIG. 2B illustrates a time series for a deployment event for a hydraulic system in a pre-fault state, and FIG. 2C illustrates a time series for a deployment event for a hydraulic system in a faulted state.

In FIG. 2A, the control signal 210 is correlated with a pressure reading 220 from time $t_0$ to time $t_9$. The control signal 210 is in a static state (e.g., logical zero) from time $t_0$ to time $t_3$, transitions to a deploying state (e.g., logical one) from $t_3$ to $t_4$, is in the deploying state from $t_4$ to $t_6$, transitions to the static state from $t_6$ to $t_7$, and remains in the static state from $t_7$ to $t_9$. A hydraulic system controlled by the control signal 210 may be in a one state (either extended or retracted) when the control signal 210 is in the static state, but transitions from that state to a different state (e.g., from extended to retracted or from retracted to extended) when the control signal 210 is in the deploying state. One or more pumps connected with the chamber 130 may pressurize the hydraulic fluid therein to move a piston 120 to an extended/retracted state starting at $t_3$ and concluding at $t_7$, and a pressure sensor 150 measures the pressure of the hydraulic fluid at times $t_0$ to $t_9$ to provide the pressure reading 220 correlated with the control signal 210. Although some variation in the pressure is expected, the pressure the hydraulic system over the course of time for the deployment event from $t_0$ to $t_9$ remains relatively constant (e.g., within ±10% of a nominal pressure value). In the illustrated example, the pressure at time $t_0$ is approximately 2500 psi (pounds per square inch), and it approximately 2500 psi at time $t_9$, and dips at time $t_3$, but dips less than 10% from 2500 psi (e.g., less than 250 psi).

In FIG. 2B, the control signal 210 is correlated with a pressure reading 220 from time $t_0$ to time $t_9$. The control signal 210 is in a static state (e.g., logical zero) from time $t_0$ to time $t_3$, transitions to a deploying state (e.g., logical one) from $t_3$ to $t_4$, is in the deploying state from $t_4$ to $t_6$, transitions to the static state from $t_6$ to $t_7$, and remains in the static state from $t_7$ to $t_9$. A hydraulic system controlled by the control signal 210 may be in a one state (either extended or retracted) when the control signal 210 is in the static state, but transitions from that state to a different state (e.g., from extended to retracted or from retracted to extended) when the control signal 210 is in the deploying state. One or more pumps connected with the chamber 130 may pressurize the hydraulic fluid therein to move a piston 120 to an extended/retracted state starting at $t_3$ and concluding at $t_7$, and a pressure sensor 150 measures the pressure of the hydraulic fluid at times $t_0$ to $t_9$ to provide the pressure reading 220 correlated with the control signal 210. Unlike the nominal state for the pressure reading 220 in FIG. 2A, the pressure reading 220 in FIG. 2B includes a spike in the pressure measured in the hydraulic system. The spike in pressure is observed occurring from time $t_4$ to $t_5$; lagging transition in the control signal 210 from $t_3$ to $t_4$, although the precise timing of the spike relative to the transition in the control signal 210 may vary in different embodiments.

The spike in pressure in the pressure reading 220 is analyzed to determine whether the hydraulic system is in a prefault state. The lowest point of the pressure spike is determined, and may be referred to as the spiked pressure value 221. The spiked pressure value 221 may be compared against a pressure threshold to determine whether the pressure of the hydraulic fluid satisfies a low-pressure threshold for consideration for whether the deployment event indicates the hydraulic system is in a prefault state. The spiked pressure value 221 may also be compared against a fault-pressure threshold 230 (shown in FIG. 2C), lower than the low-pressure threshold, to determine when the hydraulic system is in a faulted state rather than a prefault state. For example, for a hydraulic system with a nominal pressure of X psi, a low-pressure threshold may be set to ⅞·X psi and a fault-pressure threshold 230 may be set to ¾·X psi (e.g., a nominal pressure of 2400 psi, a low-pressure threshold of 2100 psi, a fault-pressure threshold 230 of 1800 psi).

The spiked pressure value 221 (and associated low-pressure threshold) may not be reliable alone in determining whether a hydraulic system is in a prefault state. For example, vibration in the hydraulic system, calibration drift, external temperature and pressure effects, pump lag, inertia of the piston 120, and other effects of operating a hydraulic system may all affect the accuracy of values collected by a pressure sensor 150. To reduce the amount of false determinations of whether a prefault state exists in a hydraulic system from using a low-pressure threshold alone as a detection mechanism, the slope 222 of the pressure spike is used in conjunction with the spiked pressure value 221.

The slope 222 from an initial pressure value to the spiked pressure value 221 is determined for the pressure spike to aid in determining when the hydraulic system is in a prefault state. The initial pressure value for determining the slope 222 may be selected based on the nominal pressure for the hydraulic system, the pressure measured at time $t_3$ (i.e., when the control signal 210 indicates the beginning of a deployment event), the highest pressure value measured between times $t_0$ to $t_3$, the average pressure value from times $t_0$ to $t_3$, etc. The change from the selected initial pressure value to the spiked pressure value 221 over time (e.g., from time $t_4$ to time $t_5$ in the present example) defines the slope 222, which may be compared against a pressure slope threshold to determine when the slope 222 indicates that the hydraulic system is in a prefault state. For example, if the pressure values in the illustrated pressure reading 220 of FIG. 2B are 2500 psi at time $t_4$ and 1500 psi at time $t_5$ (the spiked pressure value), and the time between $t_4$ and $t_5$ represents 100 ms, the slope 222 is measured to be −10,000 psi/s.

By comparing the spiked pressure value 221 and the slope 222 against respective thresholds to determine whether the hydraulic system is in a prefault state, a more reliable determination may be made—and made sooner—than if only one of the spiked pressure value 221 or the slope 222 were used. In a case, a hydraulic system may be determined to be in a nominal state despite a slope 222 having a large enough value to satisfy a pressure slope threshold due to the spiked pressure value 221 not satisfying the low-pressure threshold, because a short time between the start of the deployment event and the spiked pressure value 221 occurring may in a large value of the slope 222 (e.g., for a constant $\Delta$pressure, a smaller $\Delta$time will result in a sharper slope value). In a second example, a hydraulic system may be determined to be in a nominal state despite a spiked pressure value 221 having a low enough value to satisfy a low-pressure threshold due to the slope 222 not satisfying the pressure slope threshold. For example, the low-pressure value may be set high, the pumps or pressure generating devices may have uneven capabilities to extend/retract the hydraulic system (which may result in pressure waves), the pressure sensor 150 may be affected by vibration, temperature, or external pressure in its accuracy, the calibration for the pressure sensor 150 may cause drift in the measured pressure values, the speed/acceleration of the complex system in which the hydraulic system is part of may affect a force on the pressure sensor 150, etc. that may make relying solely on the spiked pressure value 221 and low-pressure threshold less accurate in identifying prefault states than using both the spiked pressure value 221 and the slope 222.

Additionally, changes in the value of the slope 222 over time between different deployment events may be used to determine when the hydraulic system is approaching a fault state. For example, a consistent increase in the value of the slope 222 in n or more deployment events may be compared against a trend threshold to determine when one or more components in the hydraulic system are beginning to display signs leading up to a fault state.

As will be appreciated, the numbers and timing used in the above examples are provided as non-limiting examples. The various pressures, time scales, and thresholds may be varied in different embodiments to account for different use cases, measurement margins, and user preferences. The values assigned for various thresholds may be determined by user input (e.g., from a subject matter expert) or may be developed from historic operational data in a machine learning model. For example, pressure data from the n deployment events prior to a fault state occurring may be analyzed to develop or set values for the thresholds to detect when the hydraulic system is in a prefault state.

In FIG. 2C, the control signal 210 is correlated with a pressure reading 220 from time $t_0$ to time $t_9$. The control signal 210 is in a static state (e.g., logical zero) from time $t_0$ to time $t_3$, transitions to a deploying state (e.g., logical one) from $t_3$ to $t_4$, is in the deploying state from $t_4$ to $t_6$, transitions to the static state from $t_6$ to $t_7$, and remains in the static state from $t_7$ to $t_9$. A hydraulic system controlled by the control signal 210 may be in a one state (either extended or retracted) when the control signal 210 is in the static state, but transitions from that state to a different state (e.g., from extended to retracted or from retracted to extended) when the control signal 210 is in the deploying state. One or more pumps connected with the chamber 130 may pressurize the hydraulic fluid therein to move a piston 120 to an extended/retracted state starting at $t_3$ and concluding at $t_7$, and a pressure sensor 150 measures the pressure of the hydraulic fluid at times $t_0$ to $t_9$ to provide the pressure reading 220 correlated with the control signal 210.

In various embodiments, a hydraulic system may be determined to be in the faulted state in response to one or more of the pressure reading 220 falling below a fault-pressure threshold 230 and/or the pressure reading 220 not returning to a nominal value within a predetermined amount of time. FIG. 2C illustrates a spike in the pressure that drops below a fault-pressure threshold 230 (illustrated at 1000 psi) and does not recover (if at all) until after $t_9$. In various embodiments, a pressure reading 220 that does not return to a nominal reading within n seconds of the deployment event beginning (e.g., by time $t_3+n$) or of the deployment event ending (e.g., by time $t_7+n$) may be determined to indicate a faulted hydraulic system, regardless of the slope or the spiked pressure value exhibited by the pressure reading 220.

Figure 3:
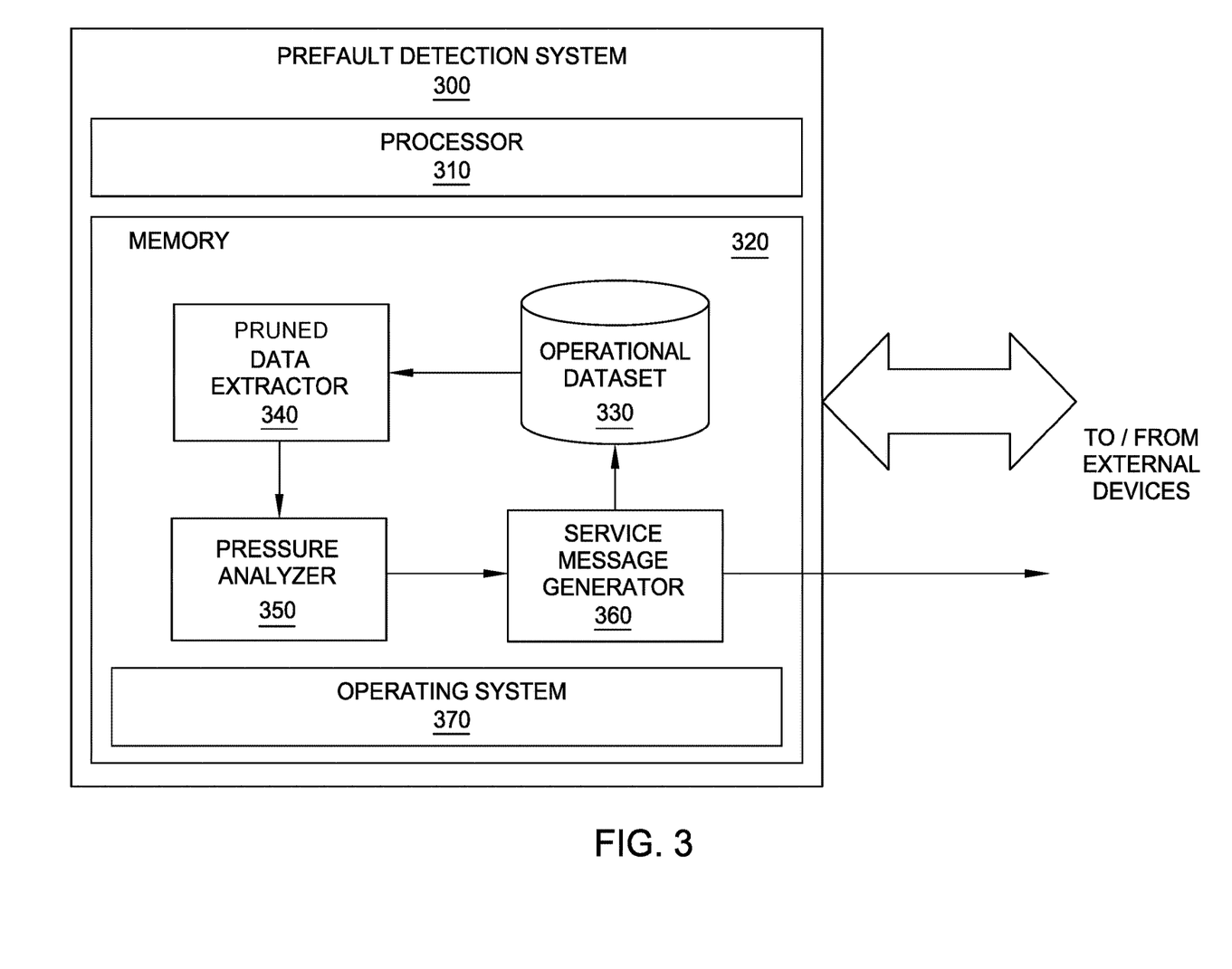
FIG. 3 is a block diagram of a prefault detection system, according to one embodiment described herein.

FIG. 3 is a block diagram of an example prefault detection system 300. The prefault detection system 300 is a computing device, which includes a processor 310 and a memory 320. The processor 310 retrieves and executes programming instructions stored in the memory 320 as well as stores and retrieves application data residing in the memory 320. A bus is used to transmit programming instructions and application data between processor 310, memory 320, I/O devices, and a network interface (not shown) to communicate with external devices. External devices are computing devices that include, but are not limited to: on-board computers of complex systems, external operator devices (e.g., devices associated with maintenance personnel), diagnostic systems, etc.

The processor 310 generally represents any piece of computer hardware that is capable of processing information such as, for example, data, computer programs and/or other suitable electronic information. The processor 310 is composed of a collection of electronic circuits some of which may be packaged as an integrated circuit or multiple interconnected integrated circuits (an integrated circuit at times more commonly referred to as a "chip"). The processor 310 is configured to execute computer programs, which may be stored onboard the processor or otherwise stored in the memory 320 (of the same or another apparatus). The processor 310 may represent a number of processors, a multi-processor core or some other type of processor, depending on the particular implementation. Further, the processor 310 may be implemented using a number of heterogeneous processor systems in which a main processor is present with one or more secondary processors on a single chip. As another illustrative example, the processor 310 may be a symmetric multi-processor system containing multiple processors of the same type. In yet another example, the processor 310 may be embodied as or otherwise include one or more application-specific integrated circuits (ASICs), field-programmable gate arrays (FPGAs) or the like. Thus, although the processor 310 may be capable of executing a computer program to perform one or more functions, the processor of various examples may be capable of performing one or more functions without the aid of a computer program.

The memory 320 generally represents any piece of computer hardware that is capable of storing information such as, for example, data, computer programs (e.g., computer-readable program code) and/or other suitable information either on a temporary basis and/or a permanent basis. The memory 320 may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk—read only memory (CD-ROM), compact disk-read/write (CD-R/W), digital versatile disk (DVD), or the like. Although shown as a single unit, memory 320 may be a combination of fixed and/or removable storage devices, such as fixed disc drives, removable memory cards, or optical storage, network attached storage (NAS), or a storage area-network (SAN). Additionally, although shown as a component of the prefault detection system 300, the memory 320 may also include computer hardware disposed remotely from the prefault detection system 300, such as, for example, external hard drives, networked storage, distributed systems and databases, cloud storage, and the like.

In various instances, the memory 320 may be referred to as a computer-readable storage medium. The computer-readable storage medium is a non-transitory device capable of storing information, and is distinguishable from computer-readable transmission media, such as electronic transitory signals capable of carrying information from one location to another. Computer-readable media as described herein may generally refer to a computer-readable storage media or computer-readable transmission media.

In addition to the memory 320, the processor 310 may also be connected to one or more interfaces for displaying, transmitting and/or receiving information. The interfaces may include a communications interface (e.g., communications unit) and/or one or more user interfaces one example of which may be a network interface. The network interface may be configured to transmit and/or receive information, such as to and/or from another apparatus(es), network(s) or the like. The network interface may be configured to transmit and/or receive information by physical (wired) and/or wireless communications links. Examples of suitable communication interfaces include a network interface controller (NIC), wireless NIC (WNIC) or the like.

The user interfaces may include a display and/or one or more user input interfaces (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

The memory 320 contains a database of an operational dataset 330, a pruned data extractor 340, a pressure analyzer 350, a service message generator 360, and an operating system 370. Generally, the operating system 370 represents software that is configured to manage computing hardware and software resources on the prefault detection system 300. The operating system 370 may further provide computing services for software applications executing on the prefault detection system 300.

The operational dataset 330 provides a repository of operational data for the complex system. For aircraft, the operational data may include operational data provided from a Flight Data Recorder (FDR), Quick Access Record (QAR), Continuous Parameter Logging System (CPL), and the Enhanced Airborne Flight Recorder (EAFR). The operational data may be gathered from several complex systems (e.g., more than one aircraft) over several periods of time, and are identifiable by the parameters measured, when the parameters were measured, a phase of operation during which the parameters were measured, the individual complex system from which the parameters were measured, and the like. Generally, the operational data are a collection of time-series measurements of pressures and commands related to hydraulic systems. Additionally, any maintenance messages or alert conditions associated with a given parameter may be stored in association with the operational data in the operational dataset 330.

Each hydraulic system may include one or more pressure sensors 150 whose data are correlated in time with one or more command systems for operation the hydraulic systems. For example, a hydraulic system may include two pressure sensors whose pressure data are correlated with a controller system for the complex system that determines when to deploy the first hydraulic system. The data from the hydraulic systems and control systems may be further correlated with data collected from other subsystems of the complex system, such as, for example, altimeter data, temperature data, speed data, humidity data, etc. Data from each of the systems may be sampled from the sensors according to a shared system clock or timestamped to correlate the disparate data with one another in a time series.

According to one embodiment, the pruned data extractor 340 analyzes the pressure and command data held in the operational dataset 330 to select and extract a subset of pruned data from the operational dataset 330 that includes pressure data and command timing data for several deployment events that meet various criteria. For example, a complex system may have data related to several deployment events, but some of those deployment events may be correlated to additional data that make the data unreliable or undesirable for analysis. For example, pressure data gathered for a partial deployment event (e.g., a deployment event lasting less than a predetermined amount of time), gathered at when a deployment condition is not satisfied (e.g., based on altitude, external temperature, external humidity), or when the hydraulic system has experienced a non-conformance (e.g., a fault in a pressure sensor 150, a data loss/corruption), data from those deployment events may be excluded from the pruned data. In some embodiments, the operational data is further pruned to reduce the amount of data to a deployment window. For example, with a hydraulic subsystem, a control signal may extend or retract a given hydraulic, and a deployment window may define that operational data related to the hydraulic subsystem are collected for n seconds before and after deployment is signaled. Data from outside of this window may remain unselected so that data in the deployment window are included in the pruned data.

The pressure analyzer 350 may detect faults in the hydraulic subsystems of the complex systems from the pruned data received from the pruned data extractor 340 and develop a model that identifies when a hydraulic system is in a prefault state. The model may be constructed in a supervised state based on the historical operational data and indicated fault states. The pruned data extractor 340 may provide the pruned data to the pressure analyzer 350, which determines whether the pruned data indicate that the hydraulic subsystem is exhibiting values for a prefault state. The model may associate prefault states in the data gathered in the n deployment events before an indicated fault states (e.g., the operational data gathered in last five flights of an aircraft before a fault are associated with a prefault state). Stated differently, as the values indicated by the currently analyzed pruned data approach the values of operational data previously linked to a lead-up to a fault state in the hydraulic subsystem, the pressure analyzer 350 may output a notification that the hydraulic subsystem is in a prefault state. In a second example, a prefault state is associated with patterns in the operational data gathered in an individual deployment event. In this way the pressure analyzer 350 may detect when a hydraulic system is in a prefault state based on trending data values that have historically been associated with a lead-up to fault states as well as individual deployment events that presage a fault state even if a subsequent deployment event does not presage an upcoming fault state.

In some embodiments, the prefault detection system 300 generates a notification in response to an analysis provided by the pressure analyzer 350 that indicates whether the hydraulic subsystem is in a prefault or a nominal state. A service message generator 360 may generate a notification that is transmitted to an external device as an alert, stored for later transmittal, or logged in the operational dataset 330 in association with the operational data for the complex system and/or deployment event for which a prefault state is detected. In various embodiments, service message generator 360 transmits the service message to a maintenance scheduler so that preventative maintenance may be scheduled (or co-scheduled with other maintenance), so that unscheduled downtime of the complex system may be reduced relative to strategies that rely on service life and/or detecting faulted systems.

Figure 4:
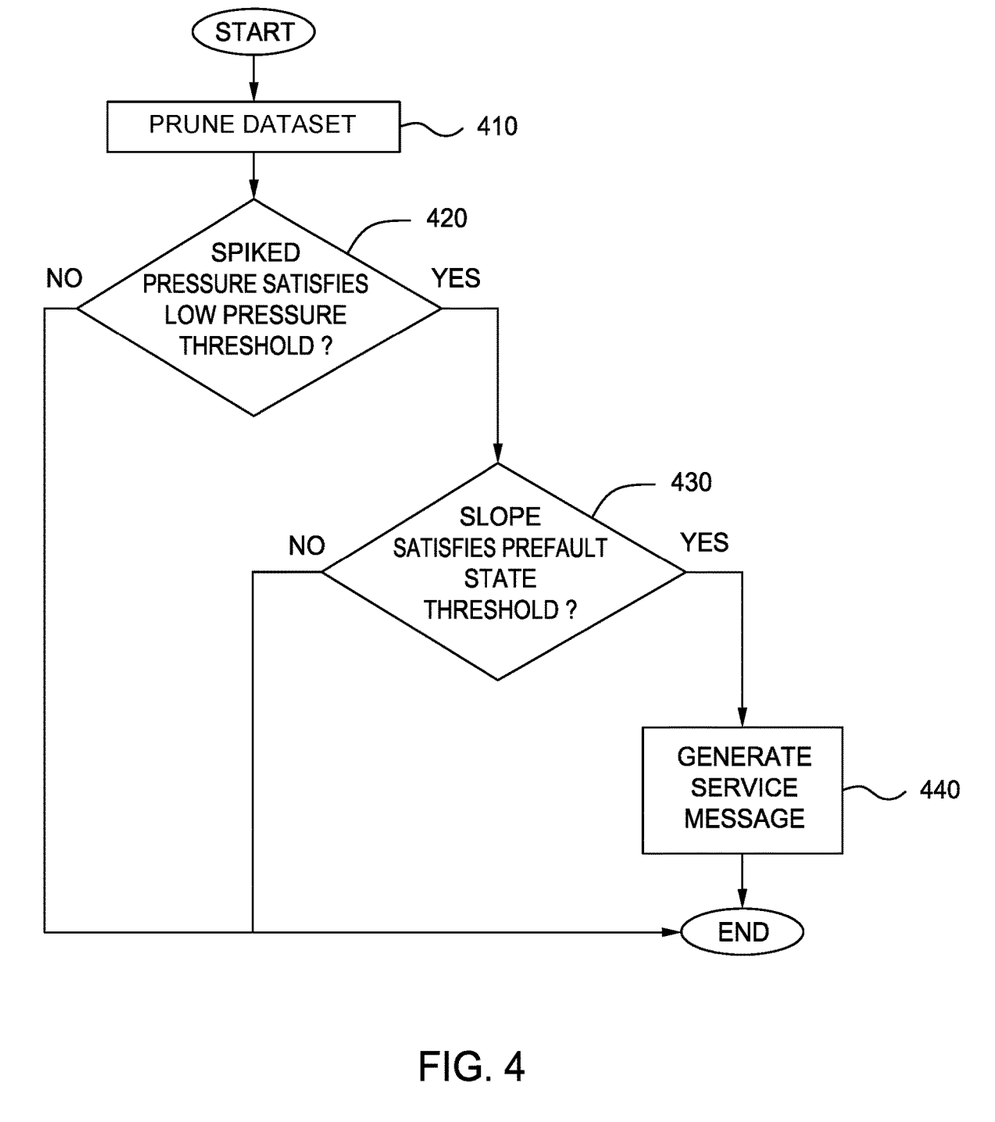
FIG. 4 is a flowchart illustrating a method for detecting whether a hydraulic system is in a prefault state, according to one embodiment described herein.

FIG. 4 is an example flowchart showing high level operations for a method 400 for detecting whether a hydraulic system is in a prefault state. Method 400 begins with block 410, where a dataset is pruned. An operational dataset 330 may include several groups of data that have various levels of relevance in determining whether a given hydraulic system within a complex system is in a prefault state. A pruned data extractor 340, therefore, may select a subset of the operational data stored in the operation dataset 330 to provide as a pruned dataset. The pruned dataset is reduced in size (i.e., an amount of data) from the operational dataset 330 by removing various data from consideration. The criteria used to select the pruned dataset from the operational dataset 330 are discussed in greater detail in regard to FIG. 5.

At block 420, a determination is made regarding whether a given deployment event includes a spiked pressure value 221 that satisfies a low-pressure threshold. If the determination for a given deployment event is positive, method 400 proceeds to block 430. Otherwise, method 400 may conclude with a determination that the hydraulic system is not in a prefault state for the given deployment event.

At block 430, a determination is made regarding whether the slope 222 satisfies a prefault state threshold. The pressure analyzer 350 may compare the value of the slope 222 against a pressure slope threshold to determine whether an individual deployment event includes a sharp enough slope to indicate a prefault state in the hydraulic system. The pressure analyzer 350 may also compare the value of the slope 222 with prior values of the slope 222 for prior deployment events to detect trends in the value of the slope 222 that show increasing sharpness of the slope 222, such that if a given number of deployment events show increasing values in slope 222 satisfy a trend threshold, a prefault state is identified. If the determination based on the slope 222 is positive, method 400 proceeds to block 440. Otherwise, method 400 may conclude with a determination that the hydraulic system is not in a prefault state for the given deployment event.

At block 440, a service message generator 360 generates a service message for the hydraulic system determined to be in a prefault state according to the spiked pressure value 221 satisfying a low-pressure threshold (per block 420) and the slope 222 satisfying a prefault state threshold (per block 430). In some embodiments, the service message is transmitted as an alert detailing which the pressure values and slopes that indicate that the hydraulic system is determined to be in a prefault state. In some embodiments, the prefault detection system 300 transmits the notification of a prefault state to a maintenance scheduler system so that a maintenance period may be scheduled for the hydraulic system at a planned time before the hydraulic system enters a fault state. Such messages to maintenance schedulers may include historical data indicating an average time from detection of the prefault state to a fault in the hydraulic system to help the maintenance scheduler determine when to schedule maintenance and whether additional maintenance activities may be co-scheduled. In a further embodiment, the service includes a visualization of deployment events and which deployments events in a series of deployment events for a complex system indicate that the hydraulic system is in a prefault state.

The alert or maintenance scheduler system may contact a command center, maintenance center or maintenance technician assigned for the complex system to address the pre-fault state in the hydraulic system at a specific time. The specific time may be co-scheduled with other maintenance events, downtime of the complex system, or a next available window when the complex system is located at the same facility as the maintenance technician. A maintenance technician may inspect and service the hydraulic system using the data in the service message to identify which hydraulic system was determined to be in the prefault state, and what data led to the hydraulic system being classified as in a prefault state. After inspecting and/or servicing the hydraulic system, the maintenance technician may then signal the maintenance scheduler or prefault detection system 300 that the hydraulic system has been returned to a nominal state or that further maintenance should be scheduled at a later time and the hydraulic system is to be classified as in a prefault or faulted state until such further maintenance is complete.

Method 400 may then conclude.

Figure 5:
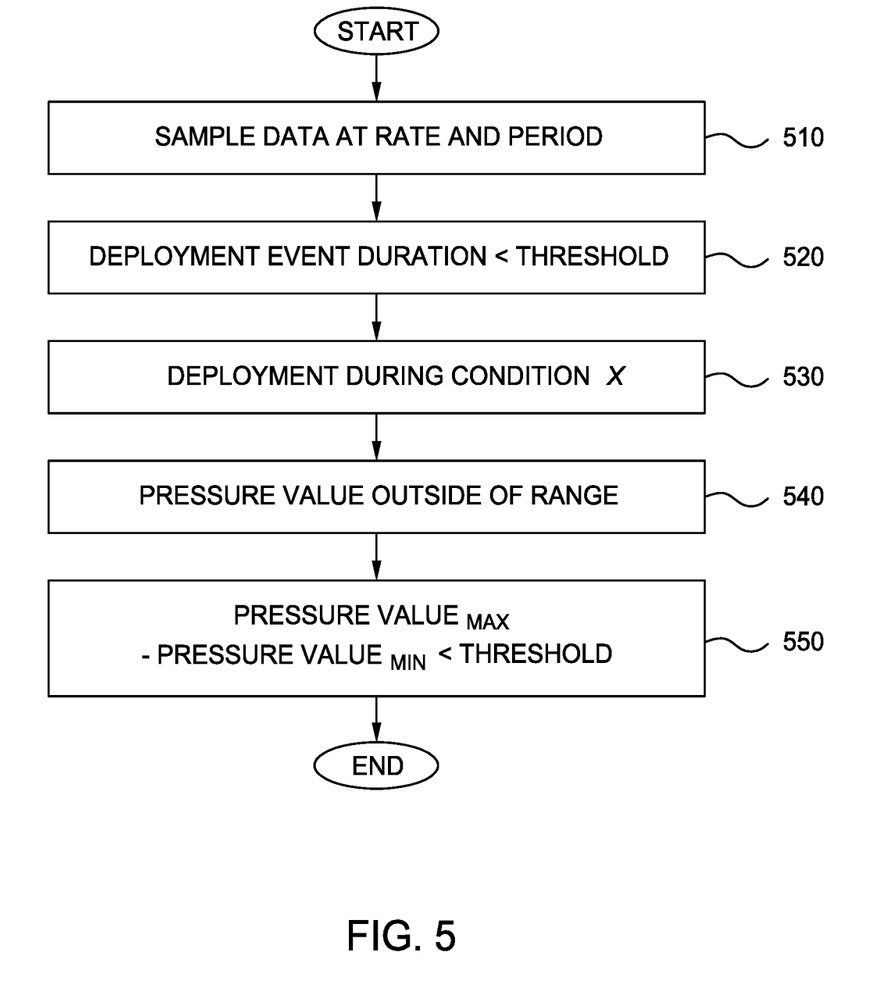
FIG. 5 is a flowchart illustrating a method for pruning a dataset for use in detecting whether a hydraulic system is in a prefault state, according to one embodiment described herein.

FIG. 5 is an example flowchart showing high level operations for a method 500 for pruning a dataset for use in detecting whether a hydraulic system is in a prefault state. Each of the blocks presented in method 500 may be performed by the prefault detection system 300 via a pruned data extractor 340 and/or a pressure analyzer 350, and a user may select various values for use in the blocks or may select for one or more of the blocks to be omitted.

At block 510, the prefault detection system 300 prunes the operational dataset 330 by applying a sampling rate and period for the data of interest. A user may select a time period of interest or a granularity in sampling of interest in determining which deployment events to include in the pruned dataset and/or how much of the available data to include in each analyzed deployment event. For example, the operational dataset 330 may include several trillion data points gathered across time, of which several billion are data points that were collected surrounding deployment events. A user may therefor specify that only the data points related to a given hydraulic system, data points collected in the last d days, data points collected in the last n deployment events, data points gathered within an s second window of a deployment event, or another period are included in the pruned dataset. A user may also specify that of the data points included in each deployment event, only a certain portion of those data points are to be used based on a sampling rate of the available data points. For example, the data points for a deployment event may be available in the operational dataset 330 for every 10 ms, but the user may specify that data collected every 100 ms is sufficient for analysis, and the prefault detection system 300 may sample the available data points at a 1:10 rate when creating the pruned dataset. In various additional embodiments, the prefault detection system 300 may also apply various other sampling rates and data retention periods to build and curate the operational dataset 330 by determining when to receive data from the various subsystems of the complex system, when to sample incoming analog data, and how long to retain collected data.

At block 520, the prefault detection system 300 prunes the operational dataset 330 by excluding deployment events with a duration less than a duration threshold. A deployment event that lasts less than a predetermined amount of time (e.g., less than X seconds) may be a deployment event that was cancelled before completion. For example, an operator may have inadvertently pressed a controller to initiate a deployment event, and cancelled or reversed the deployment event before completion. A deployment event that lasts less than the predetermined amount of time may also be the result of minor adjustment of the hydraulic system. For example, an operator of a hydraulic lift may initiate a deployment event to raise a platform of the lift by several feet, and then initiate a smaller deployment event to adjust the height of a platform by a few inches. The short-duration deployment events may not be representative of deployment events lasting X or more seconds, due to pressure waves, the effects of overcoming inertia in the hydraulic system, the effects of starting/stopping hydraulic pumps, or the rapid switch in whether the deployment event is extending/retracting the piston 120, and therefore may be excluded from the pruned dataset.

At block 530, the prefault detection system 300 prunes the operational dataset 330 by excluding deployment events that were gathered when the complex system was experiencing a specified deployment condition. In some embodiments, a user may specify various deployment conditions that may be associated with unreliable data so that affected deployment events may be excluded from the pruned dataset. In other embodiments, a user may specify various deployment conditions that may be associated with data of particular interests so that data points not associated with the deployment condition are excluded from the pruned dataset. Examples of deployment conditions may include a direction of deployment (e.g., exclude/include extension or retraction deployment events), an external temperature range, an external barometric pressure, a weather condition (e.g., wind speed, precipitation), a travel speed of the complex system, an altitude of the complex system, whether a back-up or secondary hydraulic pump was employed during the deployment event, etc.

At block 540, the prefault detection system 300 prunes the operational dataset 330 by excluding deployment events where the pressure values for the deployment event fall outside of a predefined range. In various cases, the pressure values falling outside of the defined range may indicate a fault in the pressure sensor 150 or a link from the pressure sensor 150 to a sampler for the operational dataset 330. For example, a deployment event with pressure values of zero may indicate that the pressure sensor 150 is inoperable or disconnected, and thus the data are unreliable. In another example, a deployment event with pressure values far above the operating pressure for the hydraulic system may indicate that the pressure sensor 150 is mis-calibrated or that the data are corrupted, and thus the data are unreliable. In some cases, the pressure values falling outside of the defined range may indicate a fault in the hydraulic system; indicating that prior deployment events may be useful for analysis for a prefault state, but that the current deployment event is not in the prefault state (by the definition of pre-fault). The user may specify various pressures, both high and low, to define the valid-pressure thresholds for a pressure range for deployment events to include for analysis in the pruned dataset.

At block 550, the prefault detection system 300 prunes the operational dataset 330 by excluding deployment events with differences (referred to as ΔP) between the maximum recorded pressure value and the minimum recorded pressure value for the given deployment event that do not satisfy a predefined threshold. A pressure value in the hydraulic system that does not change more than the predefined threshold for ΔP may be indicative of a hydraulic system in the nominal state (e.g., with a small spiked pressure value 221), a hydraulic system in the faulted state (e.g., a hydraulic pump does not affect the hydraulic fluid), or may be indicative of unreliable pressure data (e.g., a pressure sensor 150 is "stuck" on a given value). In cases in which the ΔP does not satisfy the threshold, the data for such deployment events may be excluded from the pruned dataset.

Method 500 may then conclude.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a DVD, a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure.

It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:
1. A method, comprising:
pruning a dataset by selecting a subset of the dataset for use as a sanitized dataset based on both command signals for a plurality of deployment events of a hydraulic system and pressure data for the hydraulic system, wherein the pruned dataset includes the pressure data for the hydraulic system correlated in time with the command signals for the plurality of deployment events of the hydraulic system;

determining that a first pressure value measured during a first extension or retraction of a piston in the hydraulic system, and included in the pruned dataset, satisfies a prefault pressure threshold, wherein the hydraulic system relates to a landing gear on an aircraft, and wherein the first extension or retraction of the piston relates to deployment of the landing gear;

identifying a first pressure slope value relating to a first change in a first plurality of pressure values over time during the first extension or retraction of the piston;

identifying a second pressure slope value relating to a second change in a second plurality of pressure values over time during a second extension or retraction of the piston in the hydraulic system, wherein the second extension or retraction of the piston relates to deployment of the landing gear, wherein the second plurality of pressure values are included in the pruned dataset, and wherein the second extension or retraction of the piston occurs earlier in time than the first extension or retraction of the piston;

determining that the first pressure slope value satisfies a prefault trend threshold based on comparing the first pressure slope value with the second pressure slope value; and determining, based on both the first pressure value satisfying the prefault pressure threshold and the first pressure slope value satisfying the prefault trend threshold, that the hydraulic system is in a pre-fault state, and in response generating a service message for the hydraulic system.

2. The method of claim 1, wherein pruning the dataset comprises selecting the subset of the dataset based on at least one of:
wherein the plurality of deployment events selected last for at least a predetermined amount of time;
wherein the plurality of deployment events selected include a deployment condition; and
wherein the pressure data during the plurality of deployment events selected satisfy a valid-pressure threshold.

3. The method of claim 2, wherein pruning the dataset further comprises selecting the plurality of deployment events based on a difference between a maximum pressure value in a particular deployment event and a minimum value in the particular deployment event satisfying a range threshold.

4. The method of claim 2, wherein the deployment condition includes at least one of:
a given altitude at which the deployment events occur; and
a given temperature at which the deployment events occurs.

5. The method of claim 1, wherein the first pressure slope value is correlated to a low pressure spike occurring at a start of a first deployment event comprising the first extension or retraction of the piston.

6. The method of claim 1, wherein at least one of the prefault pressure threshold or the prefault trend threshold are determined using a supervised machine learning model trained using historical operational data and indicated fault states relating to one or more hydraulic systems.

7. A non-transitory computer-readable storage device including processor executable instructions that enable a processor to perform operations comprising:
pruning a dataset by selecting a subset of the dataset for use as a sanitized dataset based on both command signals for a plurality of deployment events of a hydraulic system and pressure data for the hydraulic system, wherein the pruned dataset includes the pressure data for the hydraulic system correlated in time with the command signals for the plurality of deployment events of the hydraulic system;

determining that a first pressure value measured during a first extension or retraction of a piston in the hydraulic system, and included in the pruned dataset, satisfies a prefault pressure threshold, wherein the hydraulic system relates to a landing gear on an aircraft, and wherein the first extension or retraction of the piston relates to deployment of the landing gear;

identifying a first pressure slope value relating to a first change in a first plurality of pressure values over time during the first extension or retraction of the piston;

identifying a second pressure slope value relating to a second change in a second plurality of pressure values over time during a second extension or retraction of the piston in the hydraulic system, wherein the second extension or retraction of the piston relates to deployment of the landing gear, wherein the second plurality of pressure values are included in the pruned dataset, and wherein the second extension or retraction of the piston occurs earlier in time than the first extension or retraction of the piston;

determining that the first pressure slope value satisfies a prefault trend threshold based on comparing the first pressure slope value with the second pressure slope value; and determining, based on both the first pressure value satisfying the prefault pressure threshold and the first pressure slope value satisfying the prefault trend threshold, that the hydraulic system is in a pre-fault state, and in response generating a service message for the hydraulic system.

8. The non-transitory computer-readable storage device of claim 7, wherein pruning the dataset comprises selecting the subset of the dataset based on at least one of:
wherein the plurality of deployment events selected last for at least a predetermined amount of time;
wherein the plurality of deployment events selected include a deployment condition; and
wherein the pressure data during the plurality of deployment events selected satisfy a valid-pressure threshold.

9. The non-transitory computer-readable storage device of claim 8, wherein pruning the dataset further comprises selecting the plurality of deployment events based on a difference between a maximum pressure value in a particular deployment event and a minimum value in the particular deployment event satisfying a range threshold.

10. The non-transitory computer-readable storage device of claim 8, wherein the deployment condition includes at least one of:
a given altitude at which the deployment events occur; and
a given temperature at which the deployment events occurs.

11. The non-transitory computer-readable storage device of claim 7, wherein the first pressure slope value is correlated to a low pressure spike occurring at a start of a first deployment event comprising the first extension or retraction of the piston.

12. A system, comprising:
a processor; and
a memory, the memory including instructions that, when executed by the processor, enable the processor to perform operations comprising:

pruning a dataset by selecting a subset of the dataset for use as a sanitized dataset, wherein the pruned dataset includes pressure data for a hydraulic system correlated in time with command signals for a plurality of deployment events of the hydraulic system;

determining that a first pressure value measured during a first extension or retraction of a piston in the hydraulic system, and included in the pruned dataset, satisfies a prefault pressure threshold, wherein the hydraulic system relates to a landing gear on an aircraft, and wherein the first extension or retraction of the piston relates to deployment of the landing gear;

identifying a first pressure slope value relating to a first change in a first plurality of pressure values over time during the first extension or retraction of the piston;

identifying a second pressure slope value relating to a second change in a second plurality of pressure values over time during a second extension or retraction of the piston in the hydraulic system, wherein the second extension or retraction of the piston relates to deployment of the landing gear, wherein the second plurality of pressure values are included in the pruned dataset, and wherein the second extension or retraction of the piston occurs earlier in time than the first extension or retraction of the piston;

determining that the first pressure slope value satisfies a prefault trend threshold based on comparing the first pressure slope value with the second pressure slope value; and determining, based on both the first pressure value satisfying the prefault pressure threshold and the first pressure slope value satisfying the prefault trend threshold, that the hydraulic system is in a pre-fault state, and in response generating a service message for the hydraulic system.

13. The system of claim 12, wherein pruning the dataset comprises selecting the subset of the dataset based on at least one of:

wherein the plurality of deployment events selected last for at least a predetermined amount of time;

wherein the plurality of deployment events selected include a deployment condition; and wherein the pressure data during the plurality of deployment events selected satisfy a valid-pressure threshold.

14. The system of claim 13, wherein pruning the dataset further comprises selecting the plurality of deployment events based on a difference between a maximum pressure value in a particular deployment event and a minimum value in the particular deployment event satisfying a range threshold.

15. The system of claim 13, wherein the deployment condition includes at least one of:

a given altitude at which the deployment events occur; and a given temperature at which the deployment events occurs.

16. The system of claim 12, wherein the first pressure slope value is correlated to a low pressure spike occurring at a start of a first deployment event comprising the first extension or retraction of the piston.

* * * * *